(12) United States Patent
Sun et al.

(10) Patent No.: US 10,662,764 B2
(45) Date of Patent: May 26, 2020

(54) NEAR-BIT CONSTANT-POWER WIRELESS SHORT-DISTANCE TRANSMISSION METHOD AND APPARATUS

(71) Applicant: Institute of Geology and Geophysics, Chinese Academy of Sciences, Beijing (CN)

(72) Inventors: Yuntao Sun, Beijing (CN); Wenxuan Chen, Beijing (CN); Wenxiu Zhang, Beijing (CN); Yongyou Yang, Beijing (CN); Jian Zheng, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 33 days.

(21) Appl. No.: 15/692,628

(22) Filed: Aug. 31, 2017

(65) Prior Publication Data
US 2018/0058199 A1 Mar. 1, 2018

(30) Foreign Application Priority Data
Aug. 31, 2016 (CN) .......................... 2016 1 0800157

(51) Int. Cl.
*E21B 47/12* (2012.01)
*G01V 11/00* (2006.01)
*H04B 15/02* (2006.01)

(52) U.S. Cl.
CPC .......... *E21B 47/122* (2013.01); *G01V 11/002* (2013.01); *H04B 15/02* (2013.01)

(58) Field of Classification Search
CPC ..... E21B 47/12; E21B 47/122; G01V 11/002; H04B 15/02
See application file for complete search history.

(56) References Cited

U.S. PATENT DOCUMENTS 5,357,481 A * 10/1994 Lester .................... G01V 1/523
181/104
7,096,313 B1 8/2006 Chang et al.
(Continued)

FOREIGN PATENT DOCUMENTS

| CN | 1740746 A | 3/2006 |
|---|---|---|
| CN | 2849164 Y | 12/2006 |

(Continued)

*Primary Examiner* — Mohamed Charioui
*Assistant Examiner* — Eyob Hagos
(74) *Attorney, Agent, or Firm* — Novick, Kim & Lee, PLLC; Allen Xue

(57) ABSTRACT

A near-bit constant-power wireless short-distance transmission apparatus includes a transmitting portion and a receiving portion. The transmitting portion is connected to a near-bit measurement sub while the receiving portion is connected to a measurement while drilling system. The transmitting portion processes data received by the bit measurement sub and then transmits it to the receiving portion. The receiving portion further processes the information and then transmits it to the measurement while drilling system. An insulating sub is inserted in the transmitting portion and separates the transmitting portion into a transmitting positive pole and a transmitting negative pole, which become electrically isolated from each other. Another insulating sub is inserted in the receiving portion and separates the receiving portion into a receiving positive pole and a receiving negative pole, which become electrically isolated from each other.

8 Claims, 3 Drawing Sheets

(56) References Cited

U.S. PATENT DOCUMENTS

| | | | |
|---|---|---|---|
| 7,762,854 B1 | 7/2010 | Peng | |
| 2001/0012703 A1 | 8/2001 | Wurm et al. | |
| 2002/0075114 A1 | 6/2002 | Hall et al. | |
| 2007/0247329 A1 | 10/2007 | Petrovic et al. | |
| 2008/0211687 A1* | 9/2008 | Price | E21B 17/028 |
| | | | 340/854.3 |
| 2009/0023502 A1 | 1/2009 | Koger | |
| 2009/0153355 A1 | 6/2009 | Price et al. | |
| 2012/0249338 A1 | 10/2012 | Merino | |
| 2012/0299743 A1 | 11/2012 | Price et al. | |
| 2014/0332235 A1 | 11/2014 | Mueller et al. | |
| 2015/0361787 A1* | 12/2015 | Taherian | E21B 47/122 |
| | | | 340/854.6 |
| 2016/0216397 A1* | 7/2016 | Donderici | E21B 47/0905 |
| 2017/0063010 A1* | 3/2017 | Su | H01R 27/02 |
| 2017/0292364 A1* | 10/2017 | Li | E21B 47/082 |
| 2017/0315263 A1* | 11/2017 | Griffing | G01V 13/00 |

FOREIGN PATENT DOCUMENTS

| | | | | |
|---|---|---|---|---|
| CN | 101289935 A | | 10/2008 | |
| CN | 201221354 Y | | 4/2009 | |
| CN | 101493008 A | | 7/2009 | |
| CN | 102418516 A | | 4/2012 | |
| CN | 202187758 U | | 4/2012 | |
| CN | 103061755 A | * | 4/2013 | |
| CN | 103577121 A | | 2/2014 | |
| CN | 204283400 U | | 4/2015 | |
| CN | 204283413 U | | 4/2015 | |
| CN | 105353357 A | | 2/2016 | |
| CN | 105760113 A | | 7/2016 | |
| CN | 105804722 A | | 7/2016 | |
| CN | 206299372 U | | 7/2017 | |
| CN | 206299375 U | | 7/2017 | |
| WO | WO-2015192225 A1 | * | 12/2015 | E21B 47/122 |

* cited by examiner

NEAR-BIT CONSTANT-POWER WIRELESS SHORT-DISTANCE TRANSMISSION METHOD AND APPARATUS

TECHNICAL FIELD

The present invention mainly belongs to the field of drilling measurement, and particularly relates to a near-bit constant-power wireless short-distance transmission method and apparatus.

BACKGROUND

At present, a near-bit logging while drilling (LWD) technology has developed rapidly. Compared with a sensor probe of a conventional logging while drilling instrument, a sensor probe of a near-bit logging instrument is closer to a bit, and is capable of relatively immediately acquiring information of a drilled stratum and relatively accurately marking a drilling trajectory so as to reduce the risk of drilling operations and increase the drilling efficiency. In general, the near-bit logging while drilling instrument has three parts: a near-bit measurement sub, a near-bit short-distance transmission apparatus, and a measurement while drilling (MWD) system. The near-bit measurement sub is placed near the bit and is internally provided with an accelerometer, a magnetic sensor and the like. It is configured to measure information of the drilling trajectory. Some systems are further provided with gamma probes and resistivity measurement subs to measure geological information of the drilled stratum in situ. The near-bit short-distance transmission apparatus has an emitter and a receiver, and a screw motor disposed between the emitter and the receiver. A function of transmitting the information of the near-bit measurement sub to the measurement while drilling (MWD) system is realized. Due to its structural limitations, in general the screw motor does not have a wired communication between the emitter and the receiver unless a structure of the screw motor is transformed, and the wired communication is realized by using the through line imbedded in the screw motor. However, this structure is not widely used due to its limitations. Near-bit short-distance transmission is developed towards a wireless transmission manner. Drilling Technology Research Institute of Research Institute of Petroleum Exploration and Development developed a method, which includes a wireless electromagnetic short-distance transmission signal generator carrying a transmitting antenna modulates data acquired by the near-bit measurement sub to generate an electromagnetic signal, and transmits and outputs the electromagnetic signal; a wireless electromagnetic short-distance transmission receiver carrying a receiving antenna receives the transmitted and output electromagnetic signal, demodulates the received electromagnetic signal, and transmits the demodulated data to the MWD system. The measurement while drilling (MWD) system as the third part is mainly composed of a probe, a battery and a mud pulse generator. The near-bit short-distance transmission apparatus transmits the received information, which is measured near the bit, to a ground system by means of the mud pulse generator for real-time monitoring by field engineers.

Implementing near-bit wired short-distance transmission by means of a manner of reconstructing the screw motor (aka mud motor) has its great shortcomings. The screw motor is mainly used in directional wells and in horizontal operations; meanwhile, there are many types of screw motors, and the screw motors used will be different in accordance with different well conditions, hole diameters, stratum environments, and slopes. Further, there are many screw motor manufacturers as well, promoting such a technology of transforming the screw motor and imbedding a through line in a screw motor drilling tool will have a great difficulty, resulting in a small application prospect in the future market.

Short-distance transmission employing the electromagnetic manner basically realizes wireless transmission across the screw motor. Signal transmission is implemented by a transmitting coil and a receiving coil utilizing a Faraday electromagnetic induction principle. However, such an implementation also has shortcomings: an induction signal receives different energies under different grounding resistance environments so that transmitting the induction signal is difficult in a low-resistance stratum. Further, a mechanical processing difficulty is relatively large, the inconvenience is brought to the scene application and the cost is higher. In addition, the wireless electromagnetic short-transmission requires two coils in a housing to serve as the transmitting coil and the receiving coil. The coils have to be completely insulated from the housing, and generally made into annular coils. The processing and installation are very complex. Further, when the contact area between the stratum and mud is small, the transmitted signal cannot be effectively transmitted to the stratum. The transmitting efficiency is low when a transmitting power is increased in order to meet a requirement for an amplitude of receiving the signal. Meanwhile, a signal to noise ratio of the received signal is also relatively poor.

SUMMARY

In view of the above-mentioned problems, an objective of the present invention is to provide a near-bit constant-power short-distance transmission method and apparatus, which realizes one-way wireless data transmission of a near-bit measurement sub to a measurement while drilling (MWD) across a screw motor in a while drilling process, is simple in structure, and facilitates market promotion and application.

The present disclosure provides a near-bit constant-power wireless short-distance transmission apparatus includes a transmitting portion and a receiving portion. The transmitting portion processes a signal and then wirelessly transmits it to the receiving portion within a short-distance. The transmitting portion has a transmitting positive pole and a transmitting negative pole. The receiving portion has a receiving positive pole and a receiving negative pole. The transmitting positive pole transmits a transmitted signal to a stratum, and the receiving positive pole receives the transmitted signal from the stratum. The transmitting positive pole, the receiving positive pole, the receiving negative pole and the transmitting negative pole form a loop, so that wireless transmission is realized.

Further, an insulating sub is inserted the transmitting portion to electrically isolate the transmitting positive pole and the transmitting negative pole from each other. Likewise, an insulating sub is inserted in the receiving portion to electrically isolate the receiving positive pole and the receiving negative pole from each other.

Further, the transmitting portion includes a constant-power control portion. The constant-power control portion monitors a current and a voltage of the transmitted signal of the transmitting portion in real time, measures true root mean square value of the current and the voltage of the transmitted signal, feeds the true root mean square value back to the transmitting portion, and further controls the power of the transmitted signal to be constant.

Further, the transmitting portion includes a transmitting processor and a transmitting driver portion. The transmitting driver portion is coupled with the transmitting positive pole and the transmitting negative pole. There are two connections between the transmitting processor and the transmitting drive portion—one is that the transmitting processor is directly connected with the transmitting drive portion, and the other is that the constant-power control portion is connected between the transmitting processor and the transmitting drive portion, The transmitting processor performs binary phase-shift keying modulation on data received from the measurement sub to obtain a modulated signal. The transmitting driver portion amplifies the modulated signal and transmits it after power driving. The constant-power control portion feeds the measured true root mean square value back to the transmitting processor, and the transmitting processor adjusts an amplitude of the transmitted signal after calculation to ensure that the transmitted signal is constant in power.

Further, the receiving portion includes a receiving transformer, a received signal analog processor and a receiving digital processor. The receiving transformer is coupled with the receiving positive pole and the receiving negative pole. The receiving transformer is connected to the received signal analog processor. The received signal analog processor is connected to the receiving digital processor. The receiving transformer realizes a differential input of a received signal to reduce a power frequency 50 Hz interference. The received signal analog processor realizes filtering and amplification of the received signal. And the receiving digital processor realizes signal sampling, digital filtering, automatic gain control and 485 communication with a MWD system.

A near-bit constant-power wireless short-distance transmission includes the following steps:

(1) installing an apparatus, wherein a transmitting portion is connected to a near-bit measurement sub, a receiving portion is connected to a measurement while drilling system, and the transmitting portion and the receiving portion are respectively installed on one of the two ends of a screw motor;

(2) transmitting data measured in the while drilling process, wherein in a bit rotation process, data measured by the near-bit measurement sub is transmitted to a transmitting processor; the transmitting processor performs binary phase-shift keying modulation on information received from the measurement sub and transmits it to a transmitting driver portion; and the transmitting driver portion amplifies the modulated signal and then transmits it to a stratum after power driving; and (3) receiving the data measured in the while drilling process, wherein signals from two poles of the receiving portion are coupled by a receiving transformer, then enter a received signal analog processor and, after being subjected to small signal differential amplification and multi-level amplification and filtering, to be digitally sampled so that originally transmitted information is obtained after digital filtering and coherent demodulation of the receiving digital processor.

Further, in the step of transmitting the data measured in the while drilling process, a constant-power control portion controls a power of the transmitted signals to be constant. The constant-power control portion monitors a transmitting current and a transmitting voltage in real time and then measures true root mean square value. The transmitting processor adjusts an amplitude of the transmitted signal after calculation, so as to ensure that a signal transmitted to a stratum is constant in power.

The device and methods disclosed herein can realize one-way wireless communication of a near-bit measurement sub and a measurement while drilling (MWD) system and realize constant-power control by real-time measurement of true root mean square value of a transmitting current and a transmitting voltage, and can achieve a transmission rate that is above 30 bits per second across a 10 m screw motor under the control of a constant-power algorithm in stratum and mud environments with different resistivity values. The apparatus is easy and convenient to make and to operate on site, and low in maintenance cost; and The housing of device disclosed herein is divided by two insulating subs into a first housing enclosing a transmitting positive pole at one end, a second housing enclosing a receiving positive pole at the other, and the middle portion that encloses the screw motor connected to transmitting negative pole and the receiving negative pole together. The first housing and the second housing are in full contact with the mud and the stratum. The surface area of the first housing is much larger than conventional means so that as long as a certain power is provided, a signal may be transmitted to the stratum. Likewise, the surface area of the second housing is also large so that an amplitude of the signal and a signal to noise ratio are greatly improved.

DETAILED DESCRIPTION

Objectives, technical solutions and advantages of the present invention will become more apparent from the following detailed description of the present invention when taken in conjunction with accompanying drawings. It should be understood that specific embodiments described herein are merely illustrative of the present invention and are not intended to limit the present invention.

Rather, the present invention encompasses any alternatives, modifications, equivalents, and solutions made within the spirit and scope of the present invention as defined by the claims. Further, in order to give the public a better understanding of the present invention, some specific details are described below in detail in the following detailed description of the present invention. It will be appreciated by those skilled in the art that the present invention may be understood without reference to the details.

Example 1

Figure 1:
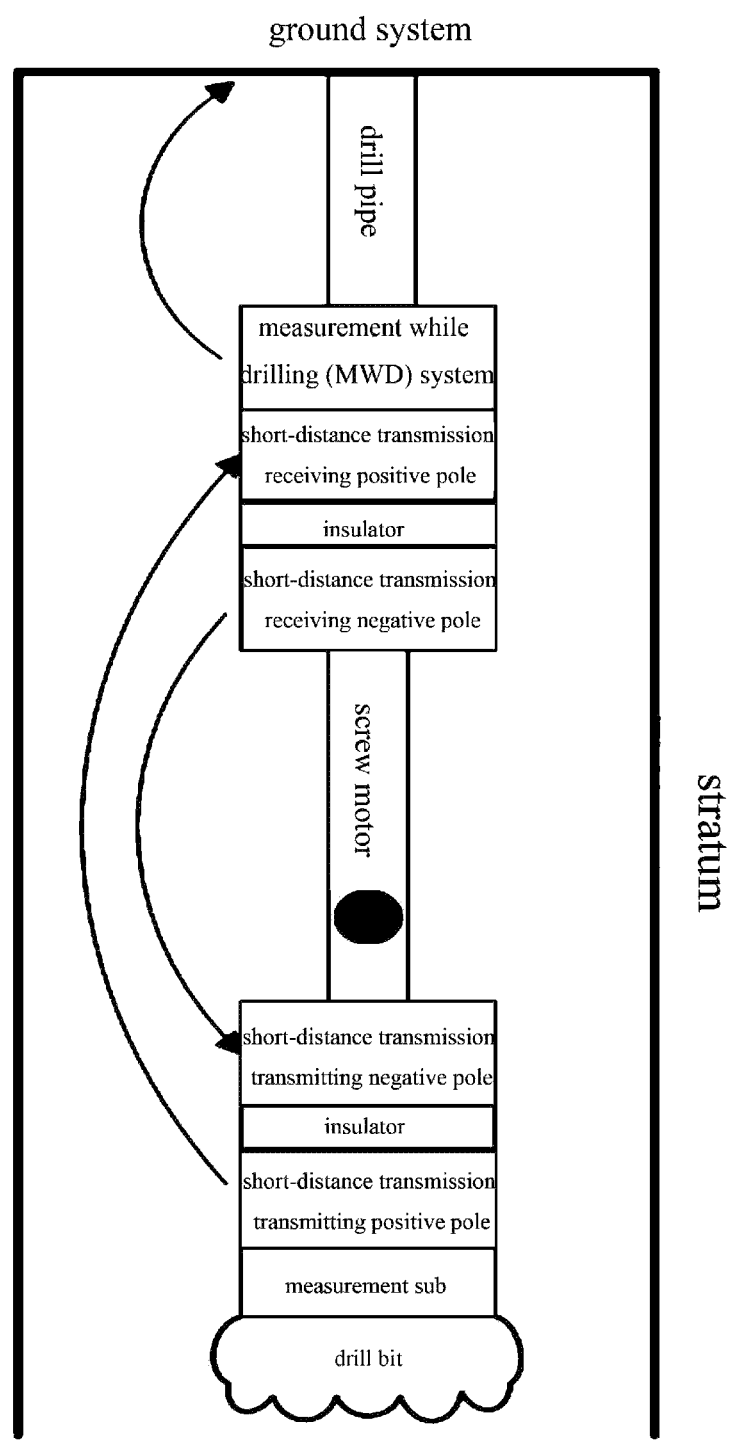
FIG. 1 is a schematic diagram of an apparatus according to the present invention.

As shown in FIG. 1, a near-bit constant-power wireless transmission apparatus includes a transmitting portion and a receiving portion. The transmitting portion is connected to a near-bit measurement sub while the receiving portion is coupled with a measurement while drilling system. The transmitting portion processes data measured by the near-bit measurement sub and then transmits to the receiving portion. The receiving portion further processes the information and then transmits it to the measurement while drilling system. An insulating sub is inserted in the middle of the transmitting portion and separates the transmitting portion into a transmitting positive pole and a transmitting negative pole, electrically insulating them from each other.

Likewise, an insulating sub is inserted in a structure of the receiving portion, and separates the receiving portion into a receiving positive pole and a receiving negative pole, electrically insulating them from each other.

Wireless transmission is realized by the transmitting signals among transmitting positive pole, the receiving positive pole, the receiving negative pole and the transmitting negative pole. Electric current signals are emitted from the transmitting positive pole into the surrounding mud and stratum or formation. A portion of the signals are received by the transmitting negative pole while another portion of the signals are received by the receiving positive pole. Note that the transmitting negative pole and the receiving negative pole are electrically coupled together through the screw motor and serves are the ground reference.

The transmitting portion includes a constant-power control portion. The constant-power control portion monitors a current and a voltage of the transmitted signal into the stratum in real time, measures true root mean square value of the current and the voltage of the transmitted signal in a device such as an AD536ASH chip, feeds the true root mean square value back to a processor in the transmitting portion (e.g., an ARM processor). The transmitting processor has an analog-to-digital convertor that converts the analog signal to digital signals. The transmitting processor calculates and adjusts the transmitting power in real time so as to keep constant the power of the signals emitted to the stratum.

Figure 2:
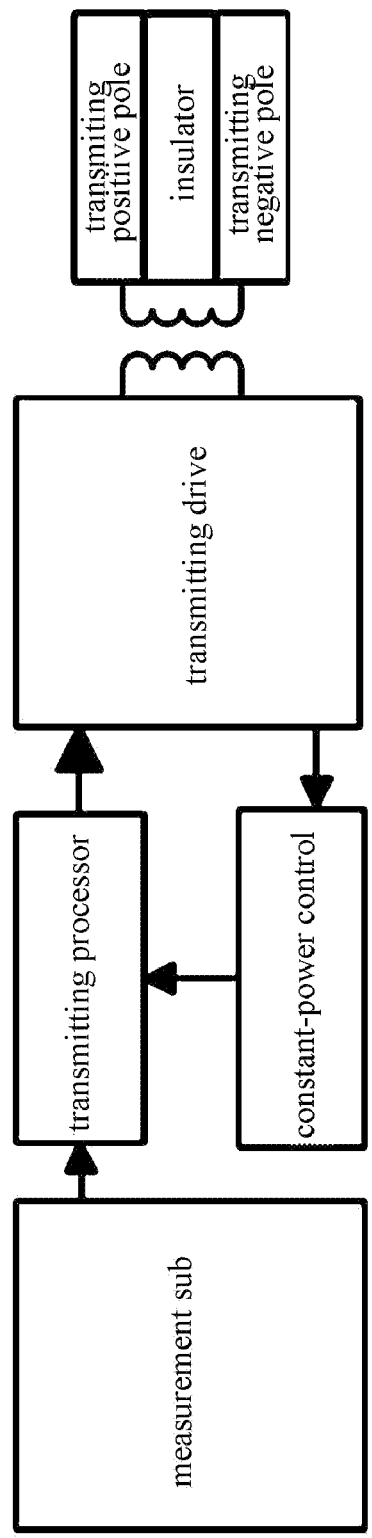
FIG. 2 is a structural diagram of a transmitting portion according to the present invention.

As shown in FIG. 2, the transmitting portion includes a transmitting processor and a transmitting driver portion. The transmitting drive portion is coupled with the transmitting positive pole and the transmitting negative pole. The transmitting processor is directly connected to the transmitting driver portion. The constant-power control portion is connected to the transmitting processor and the transmitting driver portion, respectively. The transmitting processor performs binary phase-shift keying modulation on data received the measurement sub to obtain a modulated signal. The transmitting driver portion amplifies the modulated signal and transmits it after power driving. The constant-power control portion feeds the measured true root mean square value back to the transmitting processor. The transmitting processor adjusts an amplitude of the transmitted signal after calculation to ensure that the transmitted signal is constant in power.

Figure 3:
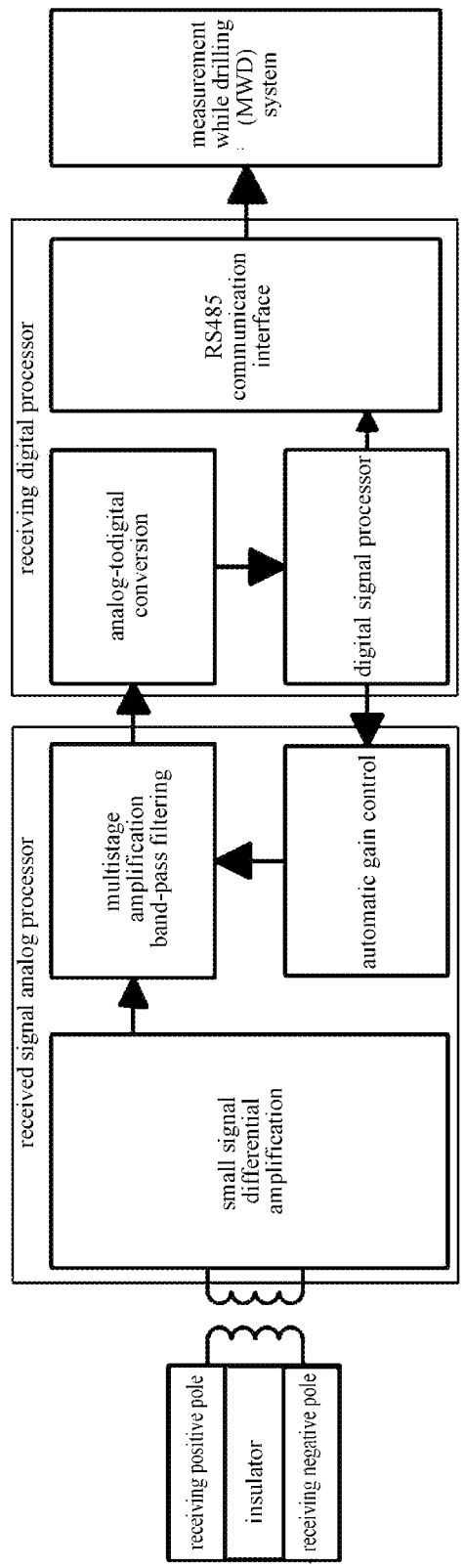
FIG. 3 is a structural diagram of a receiving portion according to the present invention.

As shown in FIG. 3, the receiving portion includes a receiving transformer, a received signal analog processor, and a receiving digital processor. In some embodiments, components in the received signal analog processor or components in the receiving digital processor are integrated on a board. The receiving transformer is coupled with the receiving positive pole and the receiving negative pole. The receiving transformer is connected to the received signal analog processor. The received signal analog processor is connected to the receiving digital processor. The receiving transformer realizes a differential input of a received signal to reduce a power frequency 50 Hz interference, e.g., filtering out signals at the power frequency of 50 Hz. The received signal analog processor realizes small signal differential amplification, multistage amplification, band-pass filtering and automatic gain control of the received signal. The receiving digital processor realizes signal analog-to-digital conversion, digital filtering, and 485 communication with a MWD system.

The near-bit constant-power wireless short-distance transmission method includes the following steps:

(1) installing an apparatus, wherein a transmitting portion is connected with a near-bit measurement sub, a receiving portion is connected to a measurement while drilling system, and the transmitting portion and the receiving portion are respectively installed either end of a screw motor;

(2) transmitting data measured in a while drilling process, wherein in a bit rotation process, data measured by the near-bit measurement sub is transmitted to a transmitting processor. The transmitting processor performs binary phase-shift keying modulation on information received from the measurement sub and transmits it to a transmitting driver portion. The transmitting drive portion amplifies the modulated signal and then transmits it to a stratum after power driving; and (3) receiving the data measured in the while drilling process, wherein signals from two poles of the receiving portion are coupled using a receiving transformer, then enter a received signal analog processor and, after being subjected to small signal differential amplification and multi-level amplification and filtering, are digitally sampled so that originally transmitted information is obtained after digital filtering and coherent demodulation of the receiving digital processor.

In the step of transmitting the data measured while drilling, a constant-power control portion controls a power of a transmitted signal to be constant. The constant-power control portion monitors a transmitting current and a transmitting voltage in real time and then measures true root mean square value. The transmitting processor adjusts an amplitude of the transmitted signal after calculation, so as to ensure that a signal transmitted to a stratum is constant in power.

Converting the true root mean square value of the transmitting voltage and the transmitting current is implemented using a true root mean square measurement chip, e.g., AD536A.

The transmitting power is kept constant at 0.1 W to 10 W, preferably 0.5 to 5 W, or 0.5-2 W, or 1 W.

Filtering and amplifying a received signal are implemented by a received signal analog processor in a step-by-step manner. The received signal is subjected to binary phase-shift keying modulation. And a carrier frequency ranges from 5 Hz to 10 Khz, an amplitude of a primary signal of a receiving end is a nV-level, and it may be extracted from noise by means of a 3-stage to 4-stage amplification band-pass filtering network.

The invention claimed is:

1. A near-bit constant-power wireless short-distance transmission apparatus comprising a transmitting portion and a receiving portion disposed along an axial direction of the apparatus, wherein the transmitting portion comprises a transmitting positive pole, a first insulating sub, and a transmitting negative pole disposed serially along the axial direction, and the first insulating sub disposed between and electrically insulates the transmitting positive pole and from transmitting negative pole, wherein the receiving portion comprises a receiving positive pole, a second insulating sub, and a receiving negative pole disposed serially along the axial direction, and the second insulating sub disposed between and electrically insulates the receiving positive pole from the receiving negative pole, wherein the transmitting positive pole transmits an electric current signal into a stratum, and the receiving positive pole receives the electric current signal from the stratum, wherein the receiving negative pole and the transmitting negative pole are electrically connected, wherein the transmitting positive pole is enclosed in a first housing, the receiving negative pole is enclosed in a second housing, and wherein, during operation, the first housing and the second housing are in contact with a drilling mud.

2. The near-bit constant-power wireless short-distance transmission apparatus according to claim 1, wherein the receiving negative pole and the transmitting negative pole are electrically connected through a screw motor and serve as a ground reference.

3. The near-bit constant-power wireless short-distance transmission apparatus according to claim 1, wherein the transmitting portion comprises a constant-power control portion that monitors a transmitting current and a transmitting voltage of the electric current signal being sent into the stratum in real time, and measures a true root mean square value of the transmitting current and the transmitting voltage of the signal being sent into the stratum.

4. The near-bit constant-power wireless short-distance transmission apparatus according to claim 3, wherein the transmitting portion comprises a transmitting processor and a transmitting drive portion, wherein the transmitting drive portion is coupled with the transmitting positive pole and the transmitting negative pole, wherein the transmitting processor performs binary phase-shift keying modulation on data received from a measurement sub to obtain a modulated signal, and the transmitting drive portion amplifies the modulated signal to be transmitted to the transmitting positive pole, and wherein the constant-power control portion feeds the measured true root mean square value to the transmitting processor, and the transmitting processor adjusts an amplitude of the signal being sent into the stratum so that the power of the signal being sent into the stratum is constant.

5. The near-bit constant-power wireless short-distance transmission apparatus according to claim 1, wherein the receiving portion comprises a receiving transformer, a received signal analog processor, and a receiving digital processor, wherein the receiving transformer is coupled with the receiving positive pole and the receiving negative pole, the receiving transformer is connected with the received signal analog processor, and the received signal analog processor is connected with the receiving digital processor, wherein the receiving transformer realizes a differential input of a received signal to reduce a power frequency 50 Hz interference, the received signal analog processor realizes filtering and amplification of the received signal, and the receiving digital processor realizes signal sampling, digital filtering, automatic gain control, and communicates with a measurement while drilling system.

6. A method for near-bit constant-power wireless short-distance transmission using the apparatus according to claim 1, comprising the following steps:

(1) installing the apparatus of claim 1 in a downhole assembly, wherein the transmitting portion is connected with a measurement sub installed above a drill bit, the receiving portion is connected with a measurement while drilling system, and the transmitting portion and the receiving portion are connected by a screw motor, wherein the transmitting portion comprises a transmitting processor and a transmitting drive portion coupled with the transmitting positive pole and the transmitting negative pole, and wherein the receiving portion comprises a receiving transformer, a received signal analog processor, and a receiving digital processor;

(2) transmitting data measured by the measurement sub to the transmitting processor, wherein the transmitting processor performs binary phase-shift keying modulation on signal received from the measurement sub and further transmits the modulated signal to a transmitting drive portion; and the transmitting drive portion amplifies the modulated signal and transmits the electric current signal to a stratum after amplification; and (3) receiving the electric current signal from the stratum at the receiving portion and transmitting the electric current signal, via the receiving transformer, to the received signal analog processor for signal amplification and filtering, and further to the receiving digital processor to be converted to a digital signal, wherein the digital signal is filtered and demodulated.

7. The method according to claim 6, further comprising maintaining a constant power of the signal being sent into the stratum, wherein the step of maintaining a constant power comprises monitoring a transmitting current and a transmitting voltage of the electric current signal being sent into the stratum in real time and then calculating a true root mean square value of the transmitting current and the transmitting voltage; and adjusting, in the transmitting processor, an amplitude of the electric current signal sent into the stratum so that the electric current signal has a constant power.

8. The near-bit constant-power wireless short-distance transmission apparatus according to claim 1, wherein the transmitting portion is connected with a measurement sub installed above a drill bit, the receiving portion is connected with a measurement while drilling system, and the transmitting portion and the receiving portion are connected by a screw motor, wherein the transmitting portion comprises a transmitting processor and a transmitting drive portion coupled with the transmitting positive pole and the transmitting negative pole, and wherein the receiving portion comprises a receiving transformer, a received signal analog processor, and a receiving digital processor;

wherein the transmitting processor performs binary phase-shift keying modulation on signal received from the measurement sub and further transmits the modulated signal to a transmitting drive portion; and the transmitting drive portion amplifies the modulated signal and transmits the electric current signal to a stratum after amplification; and wherein the electric current signal from the stratum is received at the receiving portion wherein the receiving transformer transmits the electric current signal to the received signal analog processor for signal amplification and filtering, and further to the receiving digital processor to be converted to a digital signal, wherein the digital signal is filtered and demodulated.

* * * * *